C. KNOWLES.
SURFACE GRINDER.
APPLICATION FILED FEB. 7, 1921.
1,424,764.
Patented Aug. 8, 1922.
8 SHEETS—SHEET 5.
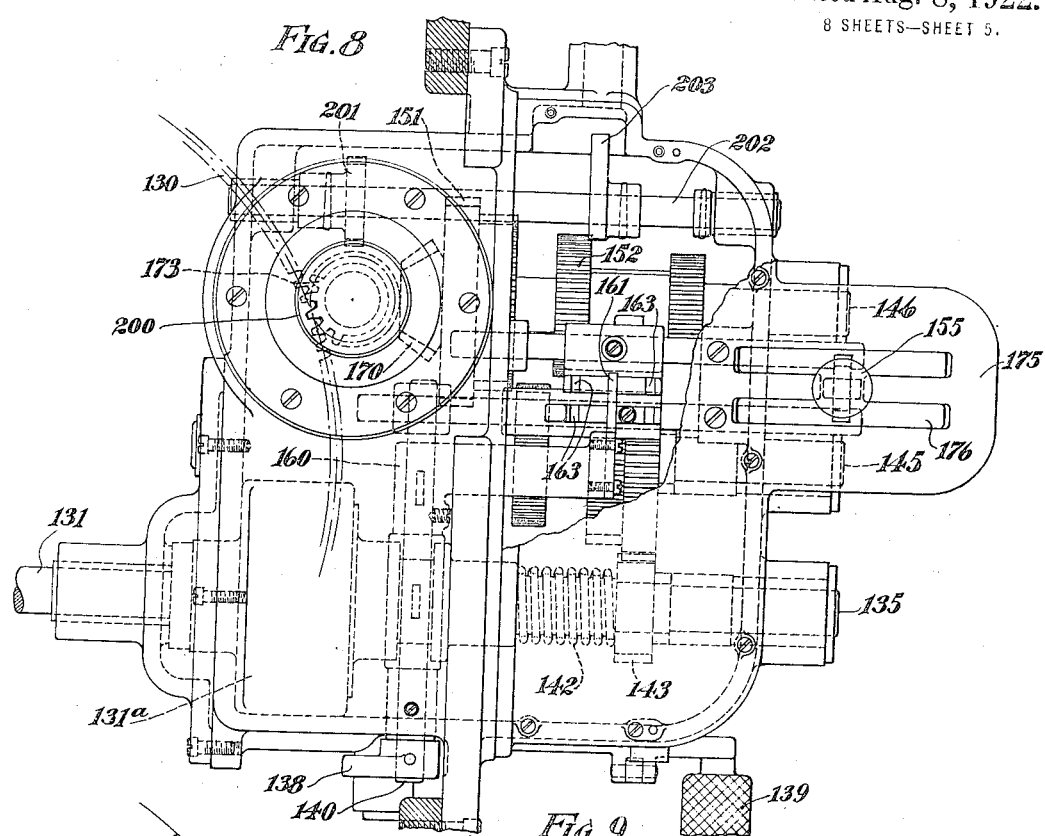
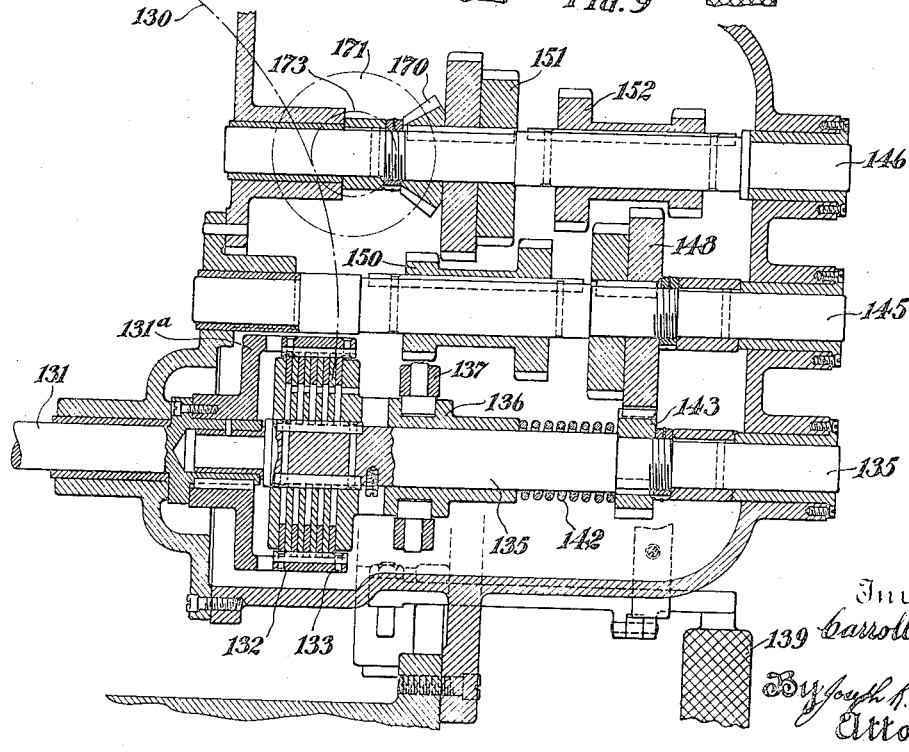
Inventor
Carroll Knowles
By Joseph K. Schofield
Attorney

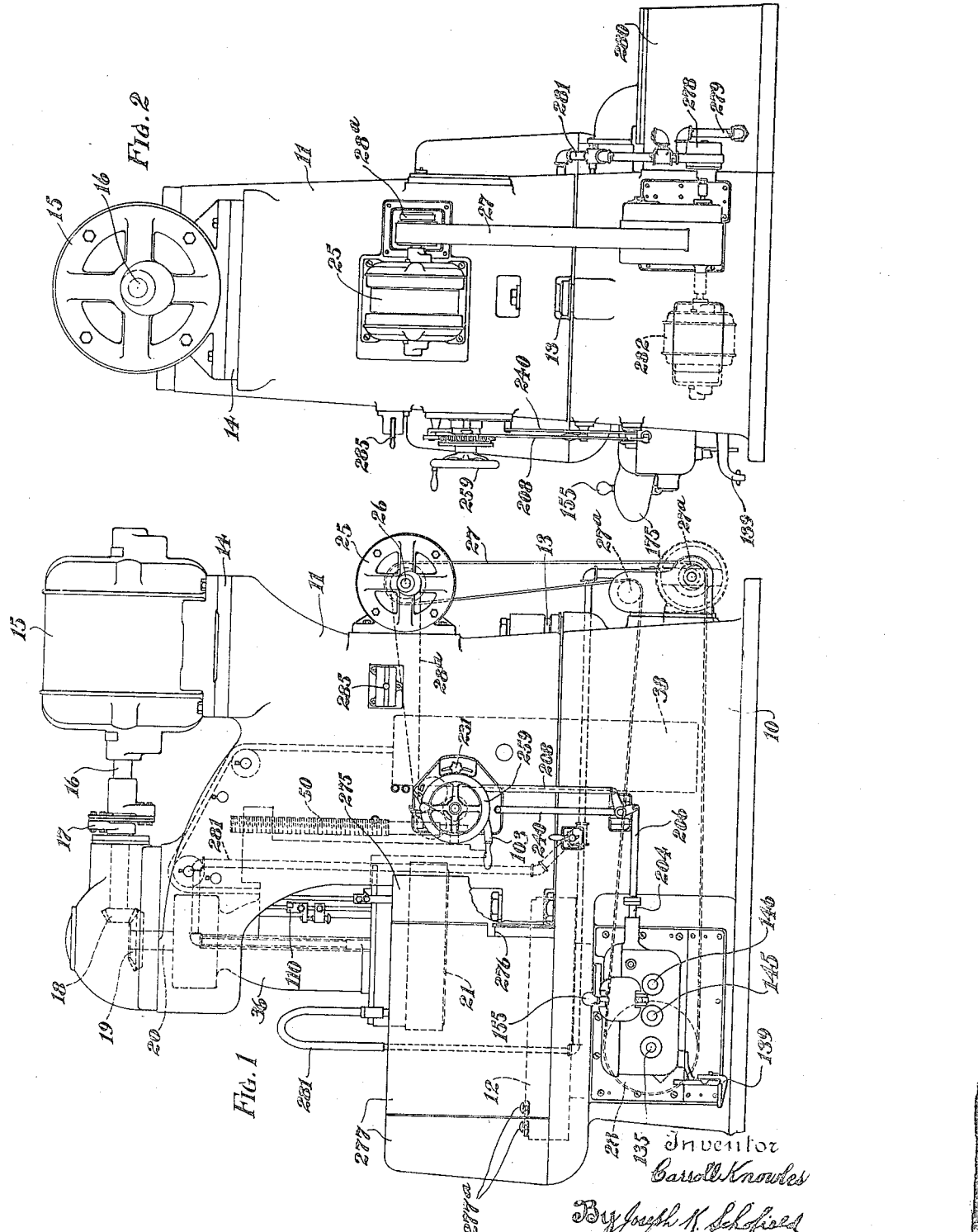

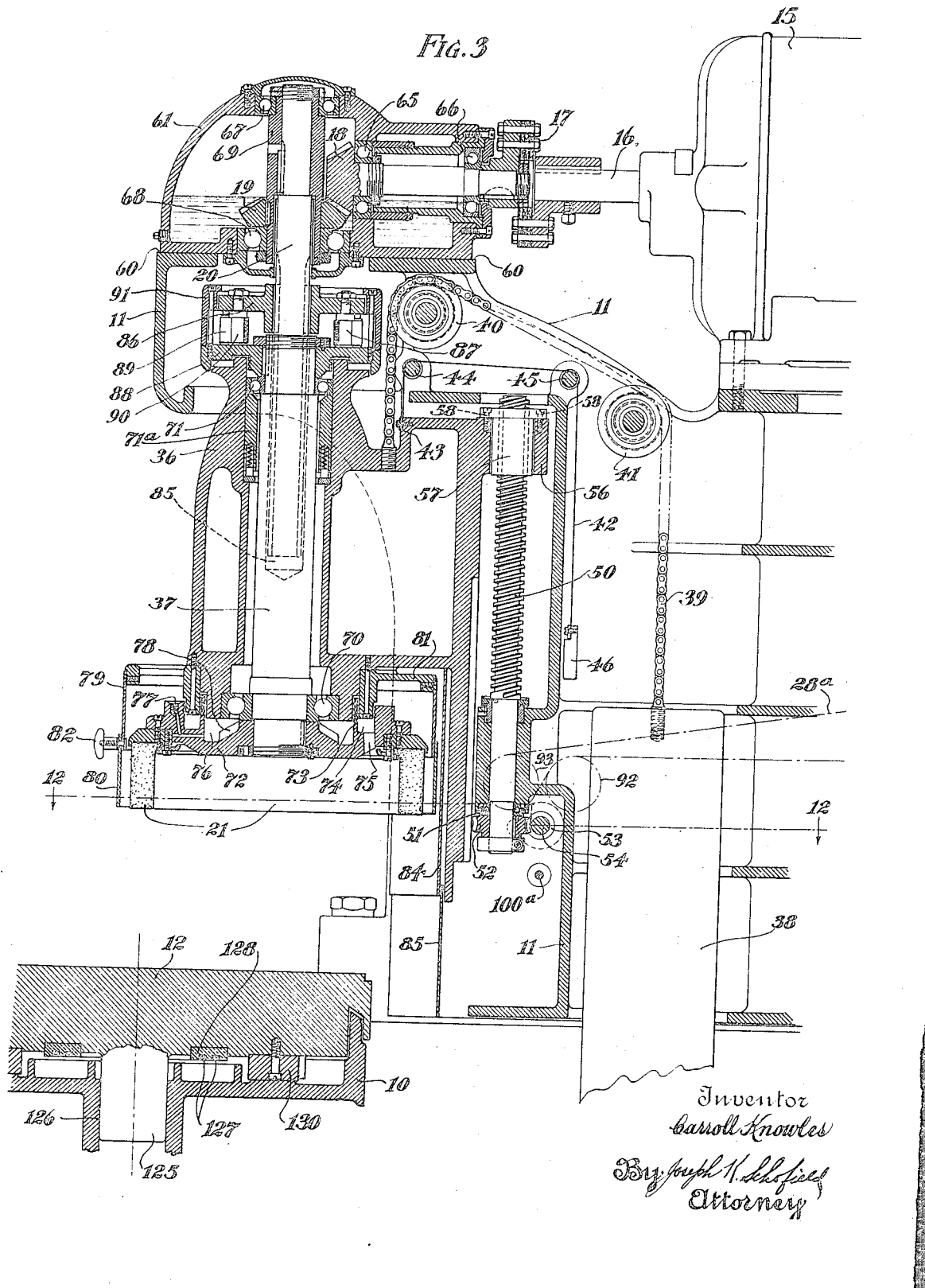

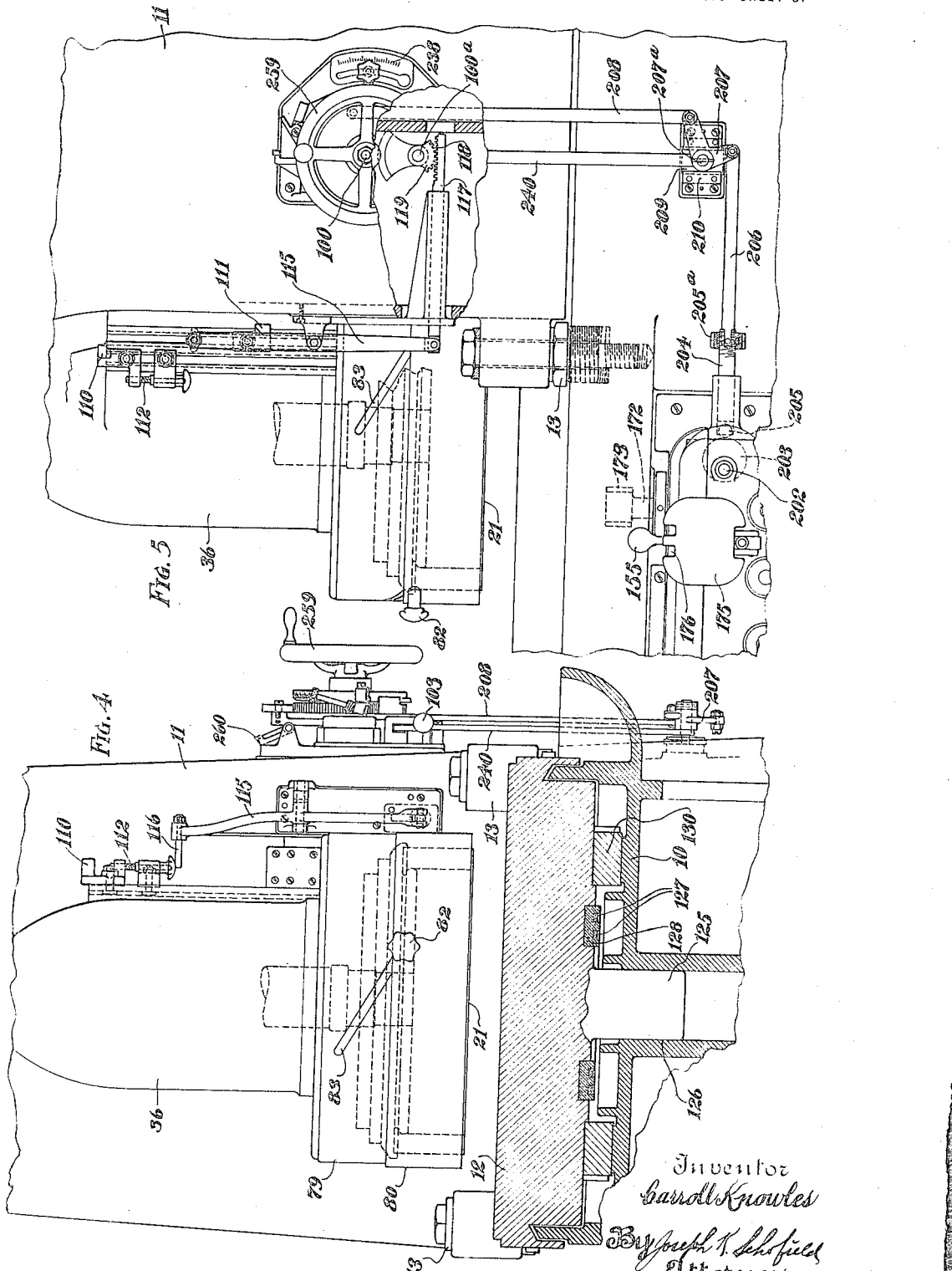

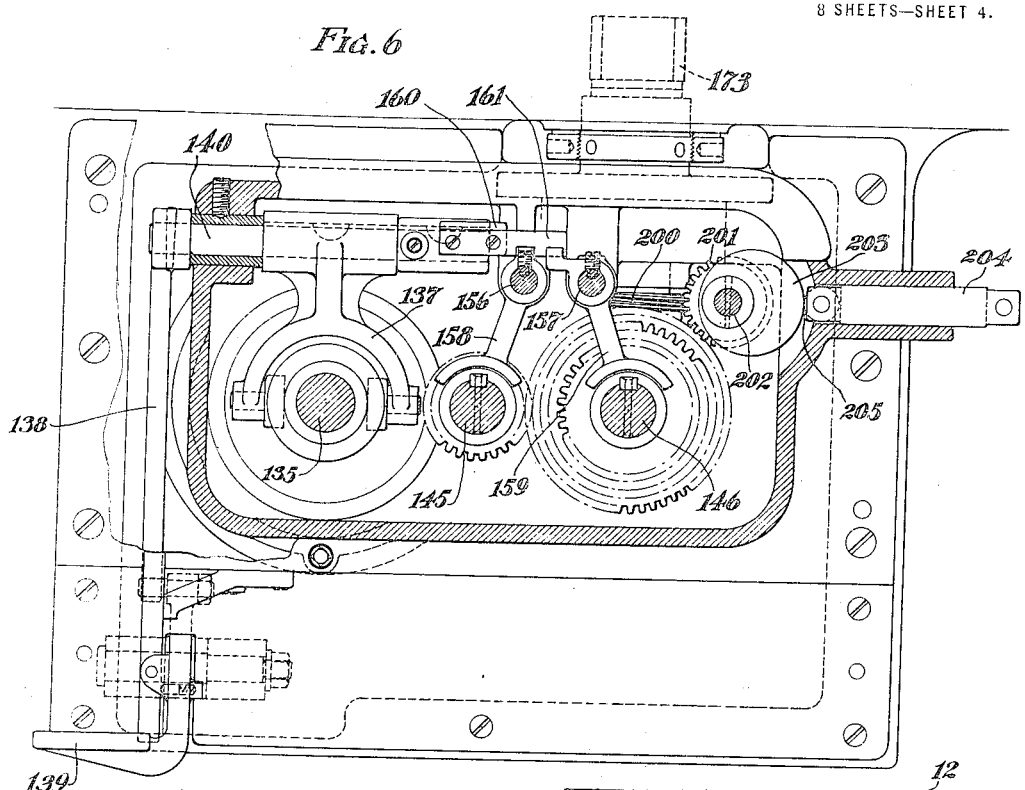
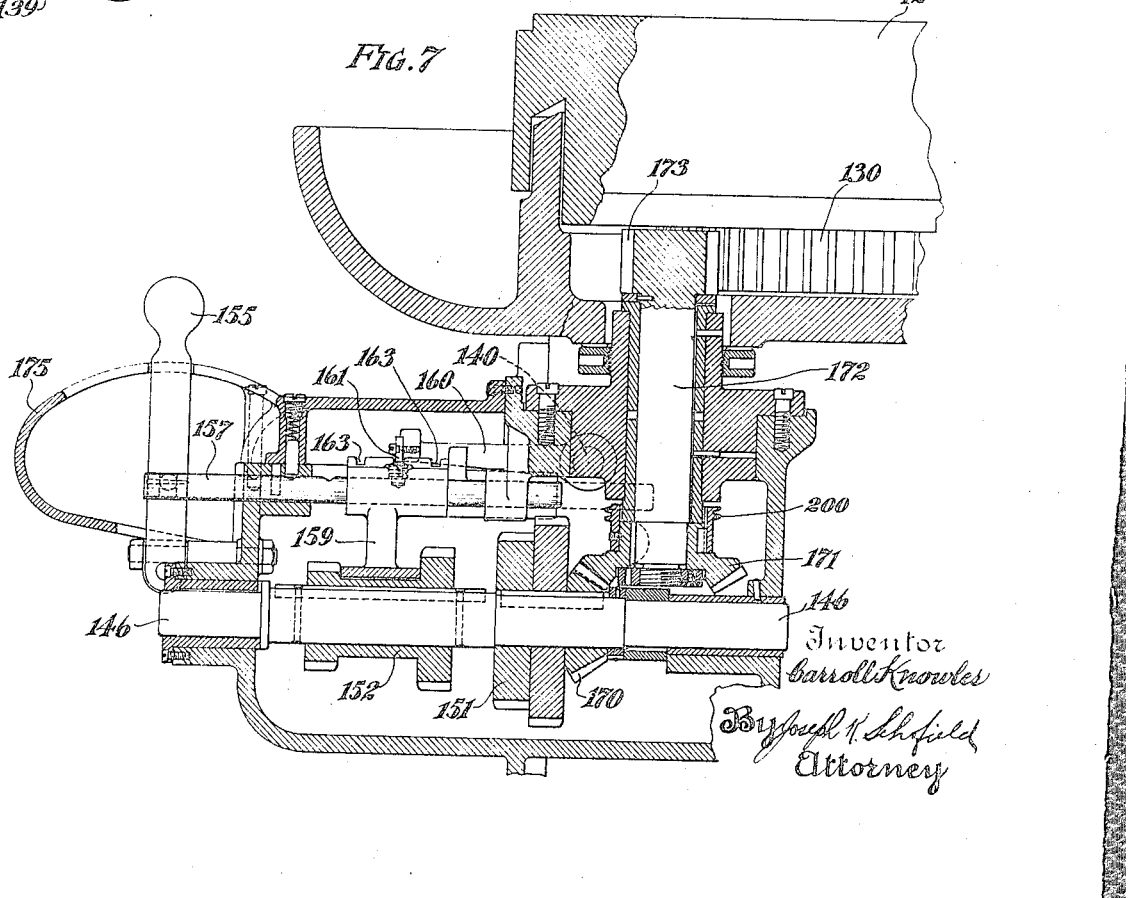

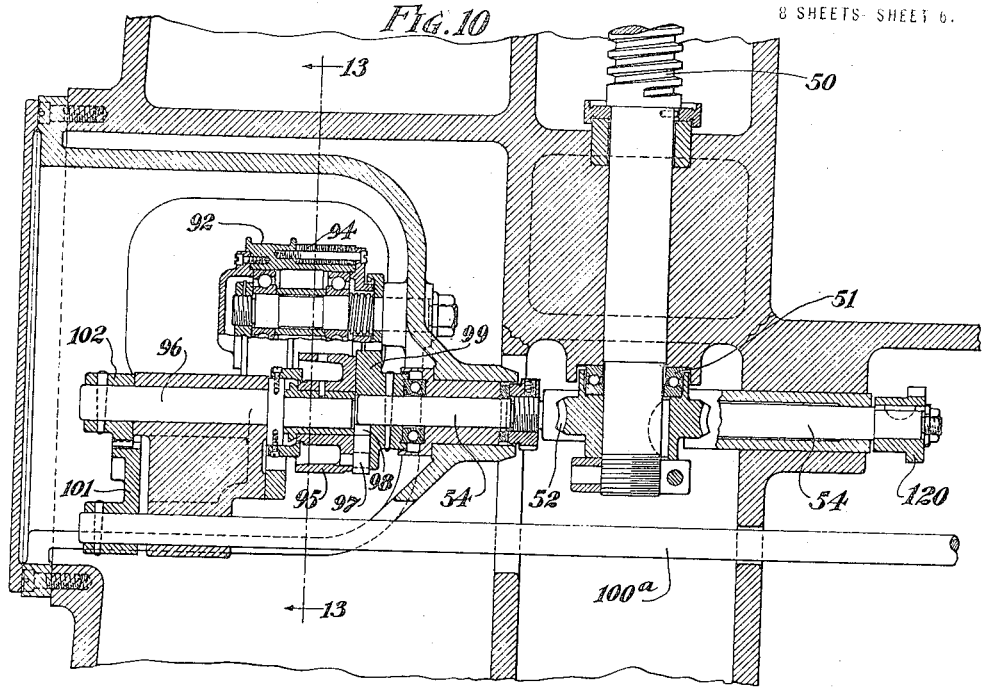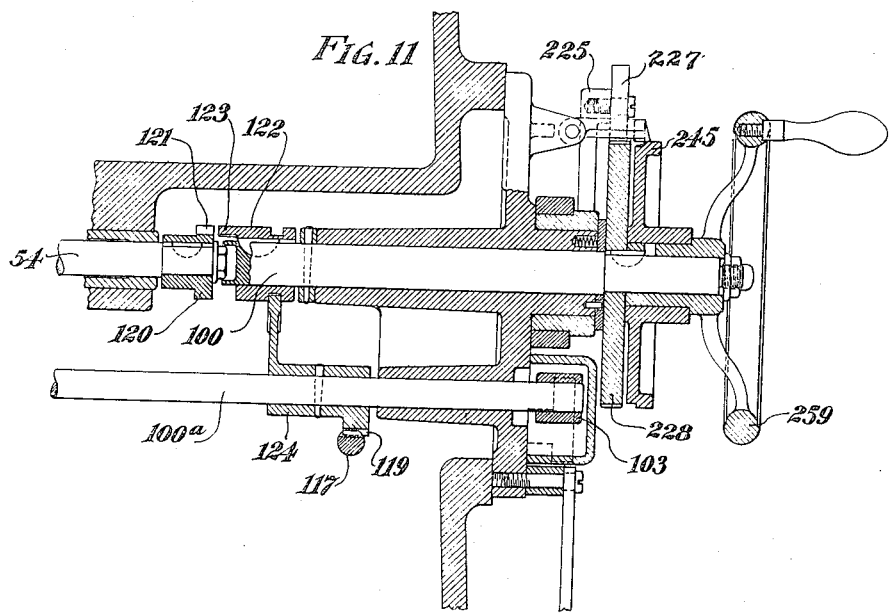

C. KNOWLES.
SURFACE GRINDER.
APPLICATION FILED FEB. 7, 1921.

1,424,764.

Patented Aug. 8, 1922.
8 SHEETS—SHEET 7.

Inventor
Carroll Knowles
By Joseph H. Schofield
Attorney

C. KNOWLES.
SURFACE GRINDER.
APPLICATION FILED FEB. 7, 1921.

1,424,764.

Patented Aug. 8, 1922.
8 SHEETS—SHEET 8.

Inventor
Carroll Knowles
By Joseph K. Schofield
Attorney

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

SURFACE GRINDER.

1,424,764.

Specification of Letters Patent.  Patented Aug. 8, 1922.

Application filed February 7, 1921. Serial No. 443,298.

*To all whom it may concern:*

Be it known that I, CARROLL KNOWLES, a citizen of the United States, residing at Hartford, in the county of Hartford and State of Connecticut, have invented certain new and useful Improvements in Surface Grinders, of which the following is a specification.

This invention relates to surface grinders and especially to a grinder of this type having a rotating table on which the articles to be ground may be grouped.

One of the objects of the present invention is to improve the construction of large size surface grinders and particularly to adapt them for rapid and accurate work on a plurality of pieces simultaneously, one of the features of the invention being that the motor for driving the abrasive wheel is independent of the motor for rotating the table and operating the feed mechanism. The wheel driving motor is located on the upper portions of the grinder frame and is connected to the wheel head through bevel gears and flexible connections so that a wide range of adjustment is possible for the wheel, and inaccuracies of alignment of the driving shafts are compensated.

Another object of the invention is to provide an improved automatic feed for the abrasive wheel, supplementary to the manual feed, permitting a fine adjustment and control of the movements of the wheel toward the work during the grinding operation.

Another object of the invention is to provide an improved rapid elevating and lowering mechanism for the wheel operated by one of the motors whereby the wheel may be quickly adjusted vertically when the finished articles are to be removed, or during the resetting of the machine for operation on different types of articles. Also, it is an object of the invention to improve the operating mechanism for the wheel feed so that adjustments of the wheel supporting column for convex or concave work will not affect the feed mechanism adjustment or the graduations indicating the amount of feed per revolution of the table.

With these and other objects in view, my invention consists in the features of construction and operation set forth in the following specification and illustrated in the accompanying drawings forming a part hereof.

In the accompanying drawings annexed hereto and forming a part of this specification, I have shown my invention embodied in one type of machine but it will be understood that the invention can be otherwise embodied and that the drawings are not to be construed as defining or limiting the scope of the invention, the claims appended at the end of the specification being drawn to define the scope of the present invention.

In the drawings:

Figure 1 is a side elevation of the complete machine.

Fig. 2 is a rear elevation of the complete machine.

Fig. 3 is a side elevation in section showing the wheel head, the means for rotating the wheel and also the means for raising and lowering the wheel.

Fig. 4 is a front elevation, partly in section, showing the wheel head, the table and a part of the wheel feeding mechanism.

Fig. 5 is a side view of the parts shown in Fig. 4.

Fig. 6 is a side elevation of a part of the table rotating mechanism and wheel feeding mechanism.

Fig. 7 is an elevation in section of the same parts shown in Fig. 6 viewed from the rear.

Fig. 8 is a plan view of the change speed mechanism for rotating the table, parts being broken away to more clearly show the construction.

Fig. 9 is a sectional view of the parts shown in Fig. 8.

Fig. 10 is a sectional view in elevation of the mechanism for rapidly elevating and lowering the wheel head.

Fig. 11 is a part of the feed mechanism for slowly feeding the wheel toward the work.

Figure 12:
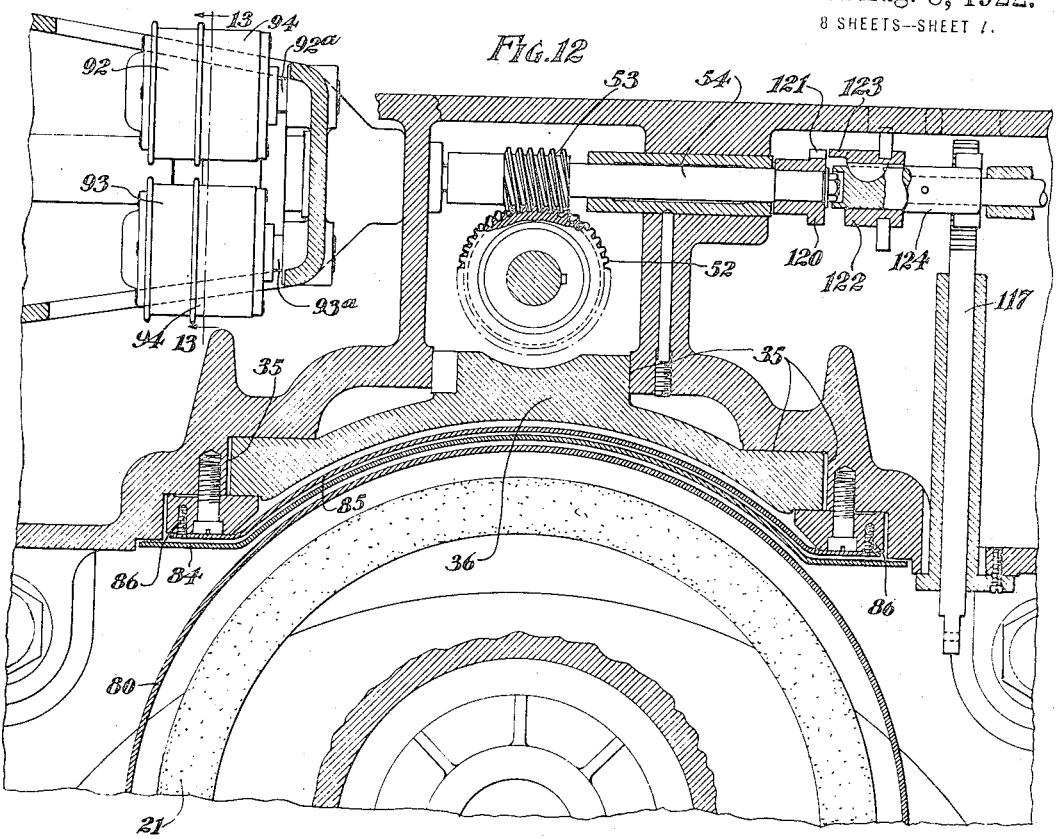
Fig. 12 is a plan view in section taken on line 12—12 of Fig. 3 showing the connection between the driving spindle for the wheel feeding means and the wheel elevating screw.

Briefly, my invention in its broadest aspect comprises the following principal parts: first, a base provided with an angularly adjustable column mounted thereon; second, a wheel head mounted on the column having an abrasive wheel rotatably supported thereon and movable in a vertical plane; third, a table rotatably mounted in the base and in operative position relative to the wheel; fourth, change speed mechanism for rotating the table; fifth, power elevating and depressing mechanism for the abrasive wheel; and sixth, mechanism for slowly feeding the wheel downward during the operation of grinding either by hand or power.

Referring more particularly to the drawings, in Figs. 1 and 2 the main outline of the principal elements is shown. These principal parts comprise a base 10 on which is mounted a column 11, and, near the forward end of the base 10, a work supporting table 12 is suitably mounted and adapted to rotate in a horizontal plane.

The column 11 is angularly adjustable on base 10 by means of adjusting screws shown generally at 13. These permit a limited angular movement or tilting of the column 11 to permit operation on slightly concave or convex work. The column 11 is surfaced near its upper extremity to form a supporting surface 14 for a motor 15. The shaft 16 for the motor 15 is connected through a flexible connection 17 with gear 18 forming one of a pair of bevel gears. The opposite gear of the pair, shown at 19, is attached to a vertical shaft 20. By means of shaft 20 the abrasive wheel 21 is rotated at a high rate of speed. The connections and feed mechanism for this abrasive wheel will be described more in detail further on. Suffice it to state at the present that means are provided for raising and lowering the abrasive wheel in relation to and while held substantially parallel with the surface of the table 12.

In order to rotate the table 12 and also to elevate and depress the abrasive wheel 21 both for adjustment and for feeding, a separate motor is provided. This is shown at 25 and is preferably mounted on a suitably surfaced portion on the rear face of the column 11. The armature shaft 26 of this motor drives a belt 27 which passes around driving pulley 28 for the table rotating mechanism presently to be more fully described. This armature shaft 26 is also provided with a pulley over which a belt 28$^a$ passes. Belt 28$^a$ passes around pulleys within the column by means of which the means for rapidly elevating the wheel is operated.

Coming now, to a detailed description of the principal parts outlined above, the construction of the column, the wheel head and the wheel rotating mechanism will first be more specifically described. This construction is shown in Figs. 3 and 12. On suitable guideways 35 provided on the front vertical face of the column 11 a tool carriage or head 36 is adapted to slide along a vertical axis. This head 36 provides a support and guide for spindle 37 to which the wheel 21 is directly fastened. The head 36 is suitably counterweighted by means of a heavy weight 38 within the column 11 which is connected to the head 36 by means of a chain 39 passing over idlers 40 and 41. For convenience and accuracy in operation of the machine, I prefer to over-counterweight the head, that is, to make the weight 38 considerably heavier than the combined weight of the head 36, the wheel 21, and the other vertically movable parts operating therewith. This provides a continually acting upward thrust to the tool head and prevents a tendency for the wheel 21 to drop slightly below the position determined by the feed mechanism. In order to protect the guideways 35 on the column 11 from grit and water, I preferably provide a flexible curtain 42 adjacent these ways. This is attached at one end to the head 36 as shown at 43 and passes over suitable rods or rollers 44 and 45 provided in the column 11, and is held in stretched condition throughout its length by a weight 46 depending from its opposite end.

To elevate or depress the wheel 21 and the head 36 a vertical elevating screw 50 is provided. This is rotatably mounted in the column 11 along a vertical axis and is provided with a ball thrust 51 near its lower end to take the upward thrust of the wheel head 36 and also to decrease friction. It will be apparent that as the counterweight 38 is heavier than the head, there is a continually acting upward thrust of this screw 50 on the thrust bearing 51. Near the lower end of the screw 50 and preferably below the thrust bearing 51 is a worm wheel 52 meshing with a worm 53 on a shaft 54 by means of which the screw 50 may be rotated by mechanism to raise or lower the wheel head 36 and wheel 21.

The tool head 36 has a projection 56 on its rearward surface which is suitably bored to contain a nut 57. The nut is rigidly fastened to the carriage head 36 by suitable screws 58 so that rotation of the screw 50 serves to traverse the nut 57 along the screw 50 and consequently moves head 36 vertically upward or downward.

At its forward and upward portion the column 11 is suitably finished to provide a supporting surface 60 for a suitable housing 61. Within this housing 61 are located the bevel gears 18 and 19 previously referred to which act as driving members for the spindle 37. The housing 61 also contains bearings for the continuation of shaft 16, which bearings are in the form of ball bearings 65 and 66. Bearings, such as shown at 67 and 68, are also provided for the shaft 20 previously referred to. I also preferably provide a sleeve 69 surrounding the shaft 20 to which the inner rings of the ball bearings 67 and 68 are fastened. This sleeve 69 is keyed to the shaft 20 as shown, bevel gear 19 is also keyed or otherwise fastened directly to this sleeve.

Coming now to a description of the wheel spindle 37 and parts associated therewith, it will be seen that the wheel 21 is mounted centrally in the head 36 on the spindle 37 which is rotatably mounted in the head 36 by means of thrust bearings 70 and 71. While in use the thrust is at all times upward on the spindle 37 so that the thrust bearings 70 and 71 are placed as shown in the Figure 3, the major portion of the thrust being taken by the lower and larger bearing 70. The upper thrust bearing 71 serves to take up the weight of the spindle 37. The spring pressed sleeve 71$^a$ surrounding the spindle 37 is constantly urged upward against the outer ring of the thrust bearing 71 and thus holds the spindle 37 and wheel 21 in their upper-most position. Between the wheel 21 and the spindle 37 is a flange or face plate 72 secured to the lower end of spindle 37 and by means of which the wheel 21 is rigidly secured to the spindle 37. This flange 72 is provided with an upstanding ring 73 extending from its upper surface which forms an annular groove 74 to which water may be continually supplied and from there admitted to the inside of the wheel 21. Water may be supplied to this groove 74 from any suitable source, not shown, and may be admitted to the inside of the wheel 21 through a channel 75 extending from the groove or ring 74 to the lower surface of the flange 72. Within the upstanding ring 73 is a small oil reservoir 76 to which oil may be supplied through a suitable inlet 77. The flange or face plate 72 is also provided with baffles or veins 78 within the oil reservoir 76 tending to force or throw the lubricating oil upward into the oil circulating channels (not shown).

Surrounding the wheel 21 and depending from the lower portion of the head 36 are annular rings 79 and 80 preferably adjustably mounted relatively to each other so that one may telescope within the other. The upper one of these rings 79 is made fast to a disk 81 rigidly secured to the head 36. By means of screws 82 the rings 79 and 80 may be held in any adjusted position relative to each other. The screws 82 pass through oblique slots 83 cut into the ring 79 as shown in Figs. 4 and 5 so that the guard ring 80 may be extended to enclose the major portion of the wheel 21.

In addition to the rings 79 and 80 attached to and moving vertically with the wheel head 36 and completely surrounding the wheel 21 are curved plates 84 and 85 placed in rear of the rings 79 and 80. Plate 85 is suitably fastened to the column 11 by screws 86 preferably extending into the straps or gibs for the wheel head slide as shown in Fig. 12. Plate 84 is fastened in any suitable way (not shown) to the wheel head 36, and the two plates are so arranged that they overlap and slide past each other. This provides an additional means to keep the water used on the wheel 21 from coming into contact with the operative parts of the mechanism or with the guideways 35 for the head 36.

To maintain a suitable flexible and adjustable driving connection between the driving shaft 20 extending from the bevel gear 19 and the wheel spindle 37 the following mechanism is provided. Between the shaft 20 and the spindle 37 a flexible connection 86 is provided so that the spindle 37 and shaft 20 are not necessarily adjusted absolutely into alignment with each other and the flexible connection 86 thus serves to allow slight variations from alignment between these two members. The spindle 37 is also suitably bored as shown at 85 so that the shaft 20 may telescope within spindle 37.

The flexible connection which I preferably use to permit vertical movement of the spindle 37 and to permit slight adjustments of alignment comprises the part 86 in the form of a flange suitably splined to the shaft 20 and having a plurality of pins 87 depending from its lower surface. Rigidly keyed and fastened to the spindle 37 is a flange 88 which has a number of pins 89 upstanding from its upper surface. Passing around and between pins 87 and 89 is a flexible belt 90 which acts as a driving connection between the shaft 20 and the spindle 37 thus permitting angular flexibility and vertical movement between shaft 20 and spindle 37. Attached to the flange 88 is an annular cover 91 suitably enclosing the parts of this flexible connection. Between the parts of the flexible connection, particularly between the pins 87 and 89 and the belt 90, slight vertical movement of the spindle 37 and shaft 20 may be taken up. Thus, while feeding the wheel 21 toward the work, that is, during the grinding operation, the vertical movement may occur between the belt 90 and pins 87 and 89 rather than between the member 86 and shaft 20.

Coming now to a description of the mechanism for rapidly raising and lowering the wheel 21, the screw 50 is used to elevate and depress the wheel head 36 during its adjustment for different sizes of work and also during the feeding operation when the spindle is in contact with the surface to be ground. To rapidly traverse the head 36 and wheel 21 up or down, the worm 53 and worm wheel 52 are rapidly rotated by the following mechanism.

Figure 13:
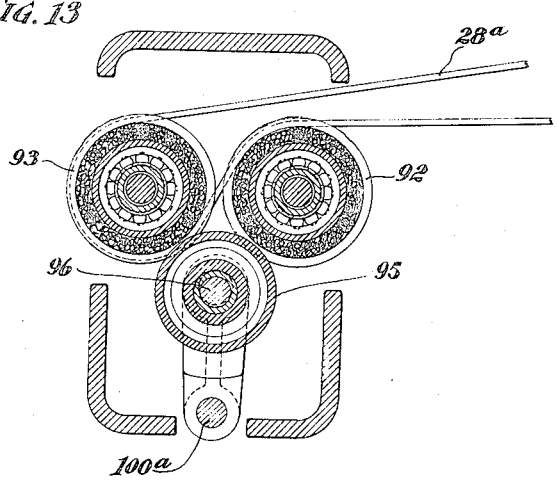
Fig. 13 is a sectional view taken on line 13—13 of Fig. 12 showing the operating means for the rapid traverse movement of the wheel head.

Belt 28$^a$ which, as above stated, is driven by means of motor 25 mounted on the rear face of column 11 passes around two pulleys 92 and 93 mounted adjacent each other and which are rotatably mounted on fixed studs 92$^a$ and 93$^a$. The belt 28$^a$ passes around the pulleys 92 and 93 in the manner indicated in Figs. 3 and 13 so that the two pulleys rotate in opposite directions. Each of the pulleys 92 and 93 is provided with a frictional surface 94 concentric with each pulley which is adapted to contact with, and frictionally drive a pulley 95. The pulley 95 is mounted eccentrically on one end of a short shaft 96 as shown in Fig. 10 so that oscillation of shaft 96 forces the pulley 95 against one or the other of the frictional driving surfaces 94 with which the pulleys 92 and 93 are provided. By means of a pin 97 inserted in the forward face of the pulley 95 engaging a slot 98 provided in a flange 99 fastened to one end of the shaft 54 this shaft is rotated. The direction of rotation of shaft 54 is dependent upon which of pulleys 92 or 93 is in engagement with pulley 95. The rotation of shaft 54 in this manner therefore rotates the worm 53 which is directly mounted on the shaft 54 and which in turn rotates the worm wheel 52 and the screw 50, thus raising or lowering the wheel head 36 relative to table 12.

To oscillate the shaft 96 and thus cause the screw 50 to be rapidly rotated in either direction I provide a rod 100$^a$ extending to one side of the machine and having at its inner end a segmental gear 101 connected with a corresponding segmental gear 102 pinned to the shaft 96. A handle 103, (see Figs. 1 and 5), conveniently mounted on the outer end of the rod 100 provides means for oscillating it thus controlling the operation of rapidly raising or lowering the wheel head 36.

In order to prevent damage to the machine or any of its parts by running the wheel head 36 so that the wheel 21 comes into contact with the table 12 or moves beyond its proper limit I provide adjustable dogs 110 and 111 (see Fig. 5) mounted at one side of the wheel head 36. The upper dog 110 may be adjusted accurately and easily by adjusting screw 112. Two of these dogs are preferably used, one to limit the upper movement of the wheel head and the other its lowermost movement. Each of the dogs 110 and 111 is provided with a cam surface. An oscillating lever 115, preferably as shown in Fig. 5, is pivotally mounted on the side of the column 11 and is provided at its upper end with a lug 116 adapted to contact with either of the dogs 110 or 111 previously described. As soon as this lug 116 comes into contact with one or the other of the cam surfaces on the dogs 110 or 111 the oscillating lever 115 is moved to vertical or midway position as shown in Fig. 5. Movement of the lever 115 to this position from either of its oblique positions moves a bar 117 connected to the lower end of the lever 115 and having, at one end, a number of rack teeth 118. These rack teeth 118 mesh with a segmental gear 119 fastened on the rod 100$^a$ so that as soon as the wheel head 36 reaches either limit of its movement the lever 115 is oscillated to its mid position. This oscillates the short shaft 96 a part of a revolution and removes the pulley 95 from contact with one of the driving pulleys 92 or 93 so that rotation of the worm 53 is stopped.

To permit the shaft 100 which is used during the feeding movements of the wheel 21 to be disconnected from the shaft 54 to permit rapid traverse of the wheel 21, I preferably use the form of connection shown in Fig. 11. At the end of shaft 54, a small flange 120 is secured having a single slot 121 extending radially therein. On the shaft 100 is slidably mounted a member 122 having a single projection 123 adapted to enter the slot 121. Member 122 is splined to shaft 100 and may be moved along the shaft 100 by sliding the shaft 100$^a$ and handle 103 a short distance. Movement of shaft 100$^a$ axially moves member 124 pinned thereto and, through a part of member 124 engaging a circular groove in the member 122 moves the projection 123 into or out of engagement with flange 120 on shaft 54. By this means the handle 103 may be utilized to control the rapid traverse movements of the wheel head 36 and also may be utilized to connect and disconnect both the power and hand feeding mechanism. For convenience the member 124 fastened to the shaft 100$^a$ may be provided with the segmental gear 19 previously referred to.

The supporting and rotating mechanism for the table will now be described.

The table 12 is rotatably mounted in the base 10 about a central projection 125 formed on the lower surface of the table 12 and adapted to fit a bearing 126 formed directly in the base 10.

Any suitable chuck (not shown) may be provided on the upper surface of this table 12 or, if desired, any means may be provided for suitably clamping the work in position. I preferably provide, however, electrical connections for a magnetic chuck, these being shown at 127 in the form of annular rings on the lower surface of the table 12 and embedded in a suitable insulating ring 128. From these slip rings 127 wires may be provided extending to a magnetic chuck provided on the upper surface of table 12 if found desirable. Also secured on the lower surface of the table 12 is a gear 130. This in the form shown is an annular ring, the gear teeth being on its outer periphery. This gear 130 depends from the lower surface of the table 12 and is suitably secured in any convenient way centrally about the projection 125. The gear 130 forms the bearing means for supporting the table 12 and the means for rotating it which means will now be described.

The motor 25, as previously stated, is provided with a belt 27 passing over suitable pulleys 27ª, and extending forwardly centrally of the base 10 and around the pulley 28. This is shown clearly in Figs. 1 and 2. The pulley 28 is fastened to a shaft 131 which forms the main driving shaft for the table rotating mechanism. This main shaft 131 is provided with a main friction clutch 131ª formed of disks 132 and 133, alternate disks being attached respectively to the shaft 131 and a shaft 135 in alignment therewith. This clutch 131ª is operated by the axial movement of the clutch member 136 which may conveniently be controlled by a yoke 137 surrounding the clutch member 136 and operated by a lever arm 138 to which a pedal 139 is connected. As shown, the yoke member 137 and arm 138 are mounted on a short shaft 140. Normally the clutch member 136 is held in closed position so that the shaft 135 is rotated. This is accomplished by means of a spring 142 interposed between the clutch member 136 at one end and abutting at its outer end against a gear 143 keyed to shaft 135.

In order to provide a plurality of different speeds for rotating the table 12 I provide change speed mechanism between the shaft 135 and the gear 130 mounted on the table 12. This change gear mechanism comprises a pair of shafts 145 and 146 parallel to each other and on which are mounted a plurality of gears of different diameters. Shaft 145 is provided with a pair of gears 148 of different diameters mounted fixedly on the shaft and a pair of sliding gears 150 also of different diameters. On the shaft 146 are mounted a pair of fixed gears 151 and a pair of sliding gears 152. As shown in Fig. 9 the gear 143 on shaft 135 is always in mesh with the larger of the gears 148 and therefore drives the shaft 145 at constant speed. Shaft 146 is driven from shaft 145 at one of four speeds dependent upon the positions of sliding gears 150 and 152. To slide the gears 150 and 152 I provide a handle 155, movement of which slides one or the other of a pair of short shafts 156 and 157 to which the gear engaging members 158 and 159 are attached. This serves to position the gears 150 and 152 so that one or the other of each pair engages one of the fixedly mounted gears on the other shaft. The speed change mechanism is such that but one pair of the sliding gears can be in mesh at the same time. This speed change mechanism is similar to well known forms of speed change gearing as, for instance, those used in automobile transmissions and therefore will not be more definitely described. As a part of the speed change mechanism I provide an interlocking mechanism to prevent the change gears 150 and 152 being changed while the clutch members 132 and 133 are in driving contact. This interlock may conveniently be mounted on and oscillated with movement of the clutch lever 138 previously mentioned. As shown, this interlock comprises an arm 160 secured to oscillating shaft 140 so that as the pedal 139 is depressed to release the clutch members 132 and 133, the arm 160 is raised sufficiently to disengage a plate 161 carried by arm 160 from notches 163 cut into the gear engaging and shifting members 158 and 159. When the clutch members 132 and 133 are in driving position, the plate 161 engages the notches 163 and prevents movement of the sliding gears 150 and 152. As soon as the pedal 139 is depressed and clutch 131ª released the plate or strip 161 is raised out of engagement from notches 163. The sliding gears 150 and 152 may then be moved by means of handle 155.

On the shaft 146 is a driving bevel pinion 170 which drives a mating bevel gear 171 fastened to the lower end of vertical shaft 172. The shaft 172 is provided at its upper end with a pinion 173 meshing with the teeth of gear 130.

Preferably the handle 155 by means of which the positions of gears 150 and 152 are controlled is surrounded by a housing 175 in which is cut an opening 176 in the form of an H. After moving the handle 155 to the left or right in slot 176 to engage it with either of the rods 156 or 157 it may be thrown forward or rearward to move one or the other of gears 150 or 152 along its shaft. The handle 155 can engage but one of the rods 156 and 157 at a time and cannot engage one of them until the other has been returned to its neutral position.

To feed the wheel 21 toward the table 12 during the grinding operation and particularly to vary the amount of feed and the limit of the feeding operation, the following mechanism is provided. On the vertical shaft 172 on which the table driving pinion 173 is mounted is a worm or spiral gear 200. This meshes with a gear 201 mounted on a cross shaft 202. Also mounted on shaft 202 is an eccentric or other form of cam 203 which is permanently fastened to shaft 202 in any suitable way. The ratio between the gear 201 and the worm or spiral gear 200 is the same as the ratio between pinion 173 and the table driving gear 130 so that the eccentric 203 rotates once with each revolution of the table 12.

A shaft or rod 204 extending along the side of the base 10 is provided with a small roller 205 at one end which is close enough to the eccentric 203 to contact therewith thus moving the shaft 204 toward the right at each revolution of the eccentric 203. At the opposite end of shaft 204 is a flexible coupling 205 at which point the shaft or rod 204 joins rod or shaft 206. Shaft 206 is attached to one arm of a bell crank 207, the other arm of which is attached to a vertical rod 208. The pivot 207ª about which the bell crank 207 oscillates is mounted on a small slide 209 suitably mounted in vertical ways 210 provided on the base 10. From this it will be seen that with rotation of the table 12, the eccentric 203 will be rotated and the vertical rod 208 reciprocated in timed relation thereto.

Rotatably mounted on the shaft 100 previously mentioned is an arm 225 which is pivotally attached as shown at 226 to the vertical rod 208, so that with reciprocations of the rod 208, the arm 225 is oscillated about the axis of shaft 100 and oscillates a pawl 227. The pawl 227 engages a ratchet wheel 228 fastened to shaft 100 and rotating therewith. By the action of the pawl 227, which is spring pressed toward the periphery of the ratchet wheel 228, the shaft 100 is very slowly rotated step by step by the vertical movements of rod 208.

To limit the oscillatory movement of the arm 225 and thus reduce the feeding action of pawl 227, I mount an adjustable arm 230 about the axis of shaft 100 and adjustably fasten it by a clamping screw 231 at any desired position in the arcuate slot 232. An abutment 235 on arm 225 takes up against arm 230, when the vertical rod 208 has completed a part of its downward movement. The amount of movement of arm 225 may therefore be varied by adjusting the position of arm 230 so that downward movement of rod 208 is stopped at one of its intermediate points.

Graduations 238 are provided adjacent the arcuate slot 232 which are so calibrated that they indicate the amount of feed of the wheel 21 toward the table 12 for each movement of the arm 225 and therefore for each revolution of the table 12. A spring 239 attached at one end to the column 11 and at its other end to the arm 225 is provided so that the arm 225 is drawn down by spring 239 after each upward movement of rod 208.

As stated above, the pivot 207ª of bell crank 207 is mounted in a slide 209. This is for the purpose of maintaining correct readings for the graduations 238 for all adjustments of the column 11. By means of the reach rod 240 extending from a point on the column 11 adjacent the rod 100 to the slide 209, the position of slide 209 is slightly varied vertically with adjustments of the column 11 so that the upper limit of movement of the arm 225 is always the same and thus the feeding movement of the arm 225 is the same from definite positions, determined by the position of the arm 230 for any adjustment of the column 11.

Adjacent the ratchet wheel 228 and rotatably mounted on shaft 100 is a dial 245, the periphery of which is provided with graduations 246 to indicate the feeding movement of the wheel 21 toward the table 12. The dial plate 245 normally rotates with the ratchet wheel 228 during the grinding operation by reason of the connection between them which comprises the following parts. On the dial plate 245 is a lug 249 through which passes a stud 250 on a small block 251 rotatably carrying a spiral gear 252. Mounted on the same member as the gear 252 is a small knob 253 by means of which the gear 252 may be rotated and therefore the relative position of the wheel 228 and the dial 245 may be varied. During the preliminary adjustments of wheel 21 when it may be desirable to rotate the dial 245 freely relative to the ratchet wheel 228, the block 251 may be swung about so that the gear 252 is disengaged from the ratchet wheel 228.

The dial 245 is provided with a shield plate 254 which is fastened to the dial plate 245 and extends over a portion of the periphery of the ratchet wheel 228. As the feeding of the wheel 21 continues, the shield plate 254 rotates with the dial 245 and wheel 228 until it occupies a position directly under the pawl 227. As soon as this occurs the pawl 227 is prevented from engaging the teeth of the ratchet wheel 228 and so the feeding of the wheel 21 is stopped.

Figure 14:
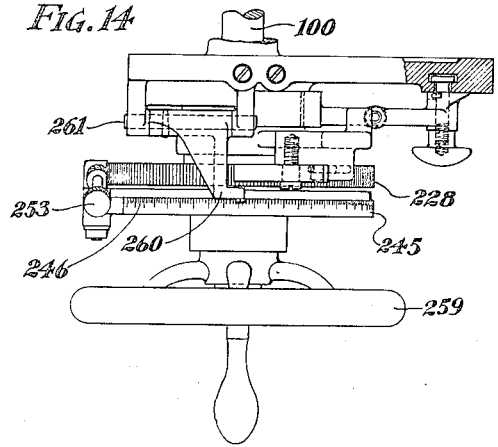
Fig. 14 is a plan view of a part of the feeding mechanism showing the means for regulating this mechanism.
Figure 15:
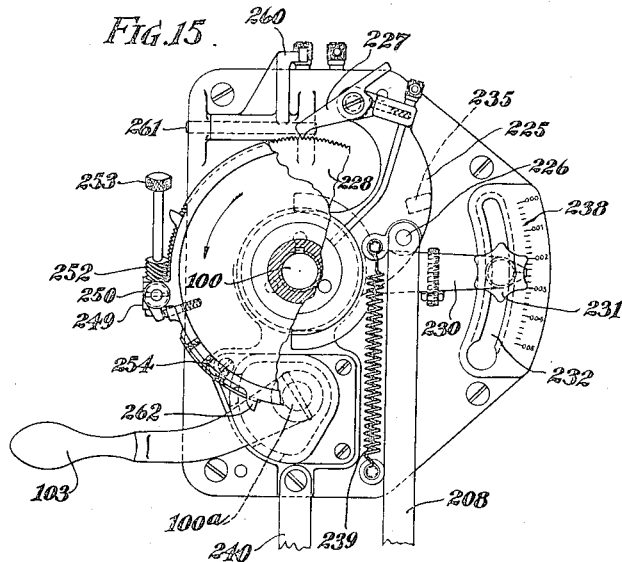
Fig. 15 is an elevation of the same.
Figure 16:
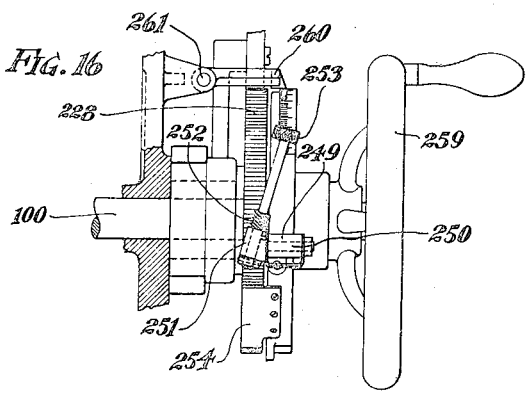
Fig. 16 is a detail showing the means permitting adjustment of the feed mechanism.

The above mechanism is used when the wheel feed is accomplished by power derived from the eccentric or cam 203. When it is desired to manually adjust the position of the wheel 21 or to feed it during the grinding operation, it is only necessary to rotate the hand wheel 259 which is fastened directly to the shaft 100. A stop 260 is mounted adjacent the dial 245 on a short shaft 261 so that it may be swung into or out of operative position. In Figs. 14 and 16, this stop is shown in operative position while in Fig.

15 it is shown swung out of operative position. In its operative position, the stop 260 strikes against the abutment 262 formed on the periphery of dial 245 and which thus prevents further manual adjustment of the wheel 21 without first removing the gear 252 from engagement with the ratchet wheel 228.

During either hand or power feeding of the wheel 21, the relative position of the dial 245 and the ratchet wheel 228 may be varied by rotation of the gear 252. This produces a slight additional rotation of the shaft 100 before the feeding is stopped by action of either of the stops 254 or 260. In this way the operator can, by slight adjustment of gear 252 compensate for the continuous wearing away of the abrasive wheel 21, or for adjusting the feed mechanism to grind to a predetermined size.

The table 12 is surrounded by a suitable enclosure in order to retain the water or other liquid used in connection with the grinding. This enclosure comprises a wall 275 partly surrounding the table 12 and fastened in any suitable way to the base 10 of the machine. Secured to this enclosure 275 by suitable hinges, one of which is shown at 276, are movable enclosure members 277 completing the enclosure about the table 12. By opening the movable enclosure members 277 access to the table may be conveniently had to remove or position work to be ground and, with the enclosure members in the position shown they form a complete enclosure for the table 12 and prevent the water from being thrown from the machine. Pins 277ª are provided to retain the movable members 277 in their closed position.

Any suitable means may be provided for supplying water to the wheel 21 and table 12, preferably I mount a pump 278 on the shaft on which one of the idler pulleys 27ª is mounted so that the pump may be operated from the motor 25 whenever the table 12 is being rotated. A suction pipe 279 extends into a settling tank 280 from which the pump 278 draws the water and forces it through pipes 281 to the contacting surfaces of the wheel 21 and the work.

On the same shaft as that on which the pump 278 is mounted may be provided an electric generator 282 of the direct current type shown in dotted lines in Fig. 2. This, however, is only necessary and is only provided when the current available for the motors 15 and 25 is alternating. The direct current supplied by generator 282 may be used for energizing the magnetic chuck with which the table 12 is equipped. A switch 285 is also provided conveniently mounted on the side of the column 11 to control the current supplied from generator 282 or other source to operate the magnetic chuck which may be mounted on table 12.

What I claim is:

1. A surface grinding machine comprising in combination, a base, a work-carrying table thereon, a vertically mounted wheel spindle, a wheel on said spindle adapted to engage work on said table, a horizontally mounted motor for rotating said wheel spindle, and driving connections between said motor and spindle comprising a pair of bevel gears and a sliding connection whereby said wheel spindle may be rotatably connected to said motor with maximum flexibility and adjustment.

2. A surface grinding machine comprising in combination, a base, a work-carrying table thereon, a vertically mounted wheel spindle, a wheel on said spindle adapted to engage work on said table, a horizontally mounted motor for rotating said wheel spindle, and driving connections between said motor and spindle including a pair of bevel gears, a flexible connection between said motor and said gears, and a sliding connection between said gears and said spindle whereby said spindle may be rotatably connected to said motor with maximum flexibility and adjustment.

3. In a grinding machine, the combination of a base, a wheel head on said base, a screw engaging said wheel head, said screw adapted to be rotated in either direction to vary the position of said wheel head, rotating means for said screw comprising a shaft and a driving connection between said shaft and screw, oppositely rotating pulleys, and means to drive said shaft from either one of said pulleys to rotate said screw in either direction.

4. In a grinding machine, the combination of a base, a wheel head on said base, a screw engaging said wheel head, said screw adapted to be rotated in either direction to vary the position of said wheel head, a worm wheel on said screw, a shaft having a worm thereon engaging said worm wheel, a rotatably mounted pulley adjacent said worm shaft, and driving means to rotate said worm shaft from said pulley.

5. In a grinding machine, the combination of a base, a wheel head on said base, a screw engaging said wheel head, said screw adapted to be rotated in either direction to vary the position of said wheel head, a worm wheel on said screw, a shaft having a worm thereon engaging said worm wheel, oppositely rotating pulleys adjacent said worm shaft, and driving means to rotate said worm shaft from either of said pulleys.

6. In a grinding machine, the combination of a base, a wheel head on said base, a screw engaging said wheel head, said screw adapted to be rotated in either direction to vary the position of said wheel head, rotating means for said screw comprising a shaft and a driving connection between said shaft and screw, oppositely rotating pulleys, and means mounted on said shaft and adapted to contact with one of said pulleys to drive said shaft from either of said pulleys and rotate said screw in either direction.

7. In a grinding machine, the combination of a base, a wheel head on said base, a screw engaging said wheel head, said screw adapted to be rotated in either direction to vary the position of said wheel head, a worm wheel mounted on said screw, a shaft having a worm thereon engaging said worm wheel, oppositely rotating pulleys adjacent said worm shaft, and an eccentrically mounted pulley adapted to frictionally engage either of said first mentioned pulleys.

8. In a grinding machine, the combination of a base, a wheel head on said base, a screw engaging said wheel head, said screw adapted to be rotated in either direction to vary the position of said wheel head, a worm wheel mounted on said screw, a shaft having a worm thereon engaging said worm wheel, oppositely rotating pulleys adjacent said worm shaft, an eccentrically mounted pulley adapted to frictionally engage either of said first mentioned pulleys, and a connection between said eccentrically mounted pulley and said worm shaft comprising a pin on said eccentrically mounted pulley and a slotted member on said shaft to drive said shaft from said last mentioned pulley.

9. A surface grinding machine comprising in combination, a base, a column adjustably mounted thereon, a table rotatably mounted on said base, a wheel head vertically movable on said column toward or away from said table, a grinding wheel thereon, means for rotating said table, means operated by said table rotating means to actuate mechanism to feed said wheel toward said table a predetermined variable amount with each revolution of the table, means to limit the feeding movement of said wheel for each revolution of said table, and means to manually vary the limit of feeding movement of said wheel.

10. A surface grinding machine comprising in combination, a base, a column adjustably mounted thereon, a table rotatably mounted on said base, a wheel head vertically movable on said column toward or away from said table, a grinding wheel thereon, means for rotating said table, a cam operated by said table rotating means to actuate mechanism to feed said wheel toward said table a predetermined variable amount with each revolution of the table, means to limit the feeding movement of said wheel for each revolution of said table, and means to manually vary the limit of feeding movement of said wheel.

11. A surface grinding machine comprising in combination, a base, a column adjustably mounted thereon, a table rotatably mounted on said base, a wheel head vertically movable on said column toward or away from said table, a grinding wheel thereon, means for rotating said table, a cam operated by said table rotating means, means operated by said cam to feed said wheel toward said table a predetermined variable amount with each revolution of the table, and means to compensate for changes in adjustment of said column.

12. A surface grinding machine comprising in combination, a base, a column adjustably mounted thereon, a table rotatably mounted on said base, a wheel head vertically movable on said column toward or away from said table, a grinding wheel thereon, means for rotating said table, a cam operated by said table rotating means, means operated by said cam to feed said wheel toward said table a predetermined variable amount with each revolution of the table, means to compensate for changes in adjustment of said column, and means to stop the feeding movement of said wheel at any predetermined position.

13. A surface grinding machine comprising in combination, a base, a column adjustably mounted thereon, a table rotatably mounted on said base, a wheel head vertically movable on said column toward or away from said table, a grinding wheel thereon, means for rotating said table, a pawl operated by said table rotating means to feed said wheel toward said table a predetermined variable amount with each revolution of the table, a ratchet wheel engaged by said pawl, a dial adjacent said ratchet wheel and means on said dial to stop the feeding movement of said ratchet wheel at any predetermined position.

14. A surface grinding machine comprising in combination, a base, a column adjustably mounted thereon, a table rotatably mounted on said base, a wheel head vertically movable on said column toward or away from said table, a grinding wheel thereon, means for rotating said table, a pawl operated by said table rotating means to feed said wheel toward said table a predetermined variable amount with each revolution of the table, a ratchet wheel engaged by said pawl, a dial adjacent said ratchet wheel and normally rotating therewith, and means mounted on said dial to stop the movement of said ratchet wheel at any predetermined position.

15. A surface grinding machine comprising in combination, a base, a column adjustably mounted thereon, a table rotatably mounted on said base, a wheel head vertically movable on said column toward or away from said table, a grinding wheel thereon, means for rotating said table, a pawl operated by said table rotating means to feed said wheel toward said table a predetermined variable amount with each revolution of the table, a ratchet wheel engaged by said pawl, a dial adjacent said ratchet wheel and normally rotating therewith, means to adjust the relative positions of said ratchet and dial, and means mounted on said dial to stop the movement of said ratchet wheel at any predetermined position.

16. A wheel feeding mechanism for grinding machines comprising in combination, a base, a wheel head on said base, a rotating shaft, means connecting said shaft to said wheel head to raise and lower said wheel head relative to said base, a ratchet wheel on said shaft, a graduated dial on said shaft mounted adjacent said ratchet wheel, and a gear mounted on said dial and adapted to engage the periphery of said ratchet wheel whereby the relative positions of the said dial and ratchet wheel may be varied.

17. A wheel feeding mechanism for grinding machines comprising in combination, a base, a wheel head on said base, a rotating shaft, means connecting said shaft to said wheel head to raise and lower said wheel head relative to said base, a ratchet wheel on said shaft, a graduated dial on said shaft mounted adjacent said ratchet wheel, and a gear mounted on said dial and adapted to engage the periphery of said ratchet wheel whereby the relative positions of the said dial and ratchet wheel may be varied, said gear being adapted to be moved into and out of engagement with said ratchet wheel.

18. A wheel feeding and adjusting mechanism for grinding machines comprising in combination, a base, a wheel head, a rotating shaft, means connecting said shaft to said wheel head to raise and lower said wheel head, a ratchet wheel on said shaft, a graduated dial rotatably mounted on said shaft adjacent said ratchet wheel, and a gear mounted on said dial and adapted to engage the teeth of said ratchet wheel whereby the relative positions of the said dial and ratchet wheel may be varied, said gear adapted to be moved into and out of engagement with said ratchet wheel.

19. A wheel feeding and adjusting mechanism for grinding machines comprising in combination, a wheel head, a rotating shaft, means connecting said shaft to said wheel head to raise and lower said wheel head, a ratchet wheel on said shaft, a graduated dial rotatably mounted on said shaft adjacent said ratchet wheel, a gear mounted on said dial and adapted to engage said ratchet wheel whereby the relative positions of the said dial and ratchet wheel may be varied, power means to rotate said ratchet wheel, and means on said dial to limit the rotation of said ratchet wheel by said power means.

20. A wheel feeding mechanism for grinding machines comprising in combination, a wheel head, a rotating shaft, means connecting said shaft to said wheel head to raise and lower said wheel head and ratchet wheel on said shaft, a graduated wheel on said shaft mounted adjacent said ratchet wheel, a gear mounted on said dial and adapted to engage said ratchet wheel whereby the relative positions of the said dial and ratchet wheel may be varied, said gear adapted to be moved into and out of engagement with said ratchet wheel, and power means to rotate said ratchet wheel.

In testimony whereof, I hereto affix my signature.

CARROLL KNOWLES.